US007015718B2

(12) United States Patent
Burky et al.

(10) Patent No.: US 7,015,718 B2
(45) Date of Patent: Mar. 21, 2006

(54) REGISTER FILE APPARATUS AND METHOD FOR COMPUTING FLUSH MASKS IN A MULTI-THREADED PROCESSING SYSTEM

(75) Inventors: William Elton Burky, Austin, TX (US); Peter Juergen Klim, Austin, TX (US)

(73) Assignee: International Buisness Machines Corporation, Armonk, NY (US)

( * ) Notice: Subject to any disclaimer, the term of this patent is extended or adjusted under 35 U.S.C. 154(b) by 471 days.

(21) Appl. No.: 10/422,684

(22) Filed: Apr. 21, 2003

(65) Prior Publication Data

US 2004/0208066 A1  Oct. 21, 2004

(51) Int. Cl.
H03K 19/177  (2006.01)
(52) U.S. Cl. .......................... 326/40; 712/300
(58) Field of Classification Search .................. 326/38, 326/39, 40, 114; 712/218, 244, 300
See application file for complete search history.

(56) References Cited

U.S. PATENT DOCUMENTS 5,896,326 A  *  4/1999  Akashi ....................... 365/200

OTHER PUBLICATIONS

U.S. Appl. No. 09/687,078, Le, et al.

* cited by examiner

Primary Examiner—Daniel D. Chang
(74) Attorney, Agent, or Firm—Weiss, Moy & Harris, P.C.; Andrew M. Harris; Casimer K. Salys

(57) ABSTRACT

A method and apparatus for computing flush masks in a multi-threaded processing system provides fast and low-logic-overhead computation of a flush result in response to multiple flush request sources. A flush mask register file is implemented by multiple cells in an array where cells are absent from the diagonal where the column index is equal to the row index. Each cell has a vertical write enable and a horizontal write enable. When a row is written to validate that row's tag value, the is column having an index equal to the row selector is automatically reset (excepting the bit corresponding to the absent cell mentioned above). On a read of a row in the array, a wired-AND circuit provided at each column provides a bit field corresponding to other rows that have been written since a last reset of the row, which is a flush mask indicating newer tags and the selected tag. Each cell in the array has an output for each thread supported by the array, and the logic provides a flush mask output for each thread as well as a combined flush mask output that supports simultaneous access for all of the threads.

6 Claims, 4 Drawing Sheets

REGISTER FILE APPARATUS AND METHOD FOR COMPUTING FLUSH MASKS IN A MULTI-THREADED PROCESSING SYSTEM

CROSS-REFERENCE TO RELATED APPLICATION

The present application is related to pending U.S. patent application Ser. No. 09/687,078 entitled "METHOD AND SYSTEM FOR DYNAMICALLY SHARED COMPLETION TABLE SUPPORTING MULTIPLE THREADS IN A PROCESSING SYSTEM" filed on Oct. 12, 2000. The specification of the above-referenced patent application is incorporated herein by reference.

BACKGROUND OF THE INVENTION

1. Technical Field

The present invention relates generally to processors and computing systems, and more particularly, to multi-threaded processing systems.

2. Description of the Related Art

Present-day high-speed processors include the capability of simultaneous execution of instructions, speculative fetching of instructions and speculative execution/partial execution of instructions.

In particular, within present-day super-scalar processors, entire program branches may lie within a range of execution from fetching up to just prior to writing final resultant values and groups of instructions whose necessary execution is contingent upon taking a particular program branch may be speculatively loaded and dispatched.

In order to manage such a super-scalar processing system, a completion table is maintained that manages the speculative execution of instructions is included within the processor. The completion table maintains tags that are associated with groups of instructions, so that internal processor elements can determine which groups of instructions have been dispatched. Upon completion or invalidation of instruction groups, the instructions must be flushed from the processor queues.

The above-incorporated patent application describes details of completion table operation and a method and system for implementing flush operations within a processor capable of simultaneously executing multiple threads. A flush table is constructed as register file operations are performed on register file elements to determine which instruction groups to flush in response to flush request indications from various units internal to the processor. However, in order to implement the scheme described in the above-incorporated patent application, logic external to the flush register file is required to perform multiple operations on the flush register file elements in order to determine a flush result that dictates which instruction groups are actually flushed. Either a large external logic is required, or a smaller external logic including multiple clock cycles for performing the required operations is needed.

It is therefore desirable to provide a method and apparatus for determining a flush result that does not require a large external logic circuit or multiple clock cycles.

SUMMARY OF THE INVENTION

The objective of determining a flush result without requiring a large external logic circuit or multiple clock cycles is achieved in a method and apparatus. The apparatus is a flush mask array including multiple storage cells forming an array. The array has no cells on a diagonal corresponding to equal row and column values and each of the cells has a separate vertical write input and a horizontal write input, so that rows of the array may be written with a value corresponding to a tag identifying an instruction group and so that corresponding column cells can be simultaneously reset (excluding the non-existent bit cell corresponding to the row which is maintained at a logic "1" value by design).

Each cell of the array also has a read output for each thread, so that simultaneous read operations qualified by thread selectors can be performed so that a separate flush mask and gtag output can be generated for a specific thread as well as a combined flush mask supporting simultaneous thread access to the flush array.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
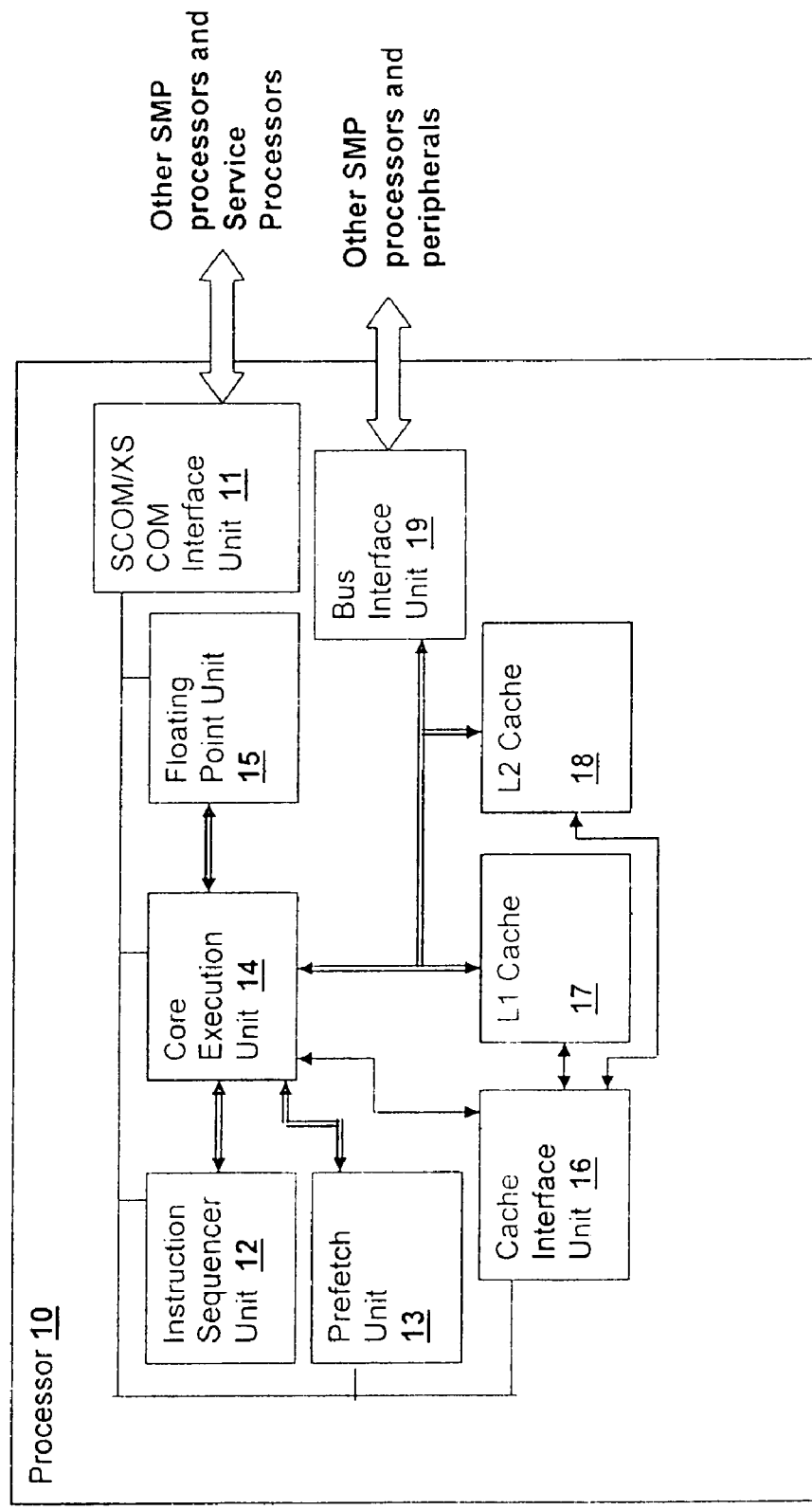
FIG. 1 is a block diagram of a processor in accordance with an embodiment of the invention.

With reference now to the figures, and in particular with reference to FIG. 1, there is depicted a block diagram of a processor 10 embodying a method and an apparatus in accordance with the present invention. Processor 10 is generally of a type used in symmetrical multi-threaded (SMT) processing systems where instructions executed by other processors may implicate values in caches or loaded into resources within processor 10. However, the techniques of the present invention apply to any processor having a flush mask register file for which a flush result must be computed.

Processor 10, includes a core execution unit 14 that controls execution of program instructions and movement of data within processor 10. Core execution unit 14 includes an instruction dispatch unit (IDU) (not shown) that dispatches groups of instructions. Tags identified by the IDU provide an input source to the flush mask register of the present invention.

Core execution unit 14 is coupled to various resources, such as an instruction sequencer unit 12 a prefetch unit 13 a cache interface unit 16, a on-board L1 Cache 17 and L2 Cache 18 as well as a floating point unit 15. An SCOM/XCOM interface unit 11 connects processor 10 to a service processor and other SMP processors in the system. A bus Interface unit 19 connects processor 10 to other processors and peripherals. Various units within processor, as well as external processors and service processors connected via SCOM/XCOM interface unit 11 and external processors connected via bus interface unit 19 may signal a flush of a particular instruction or data group, requiring identification of dependent instruction and data groups that must also be flushed. Internal flush sources include prefetch unit 13, a completion unit within core execution unit 14 and other sources.

Figure 2:
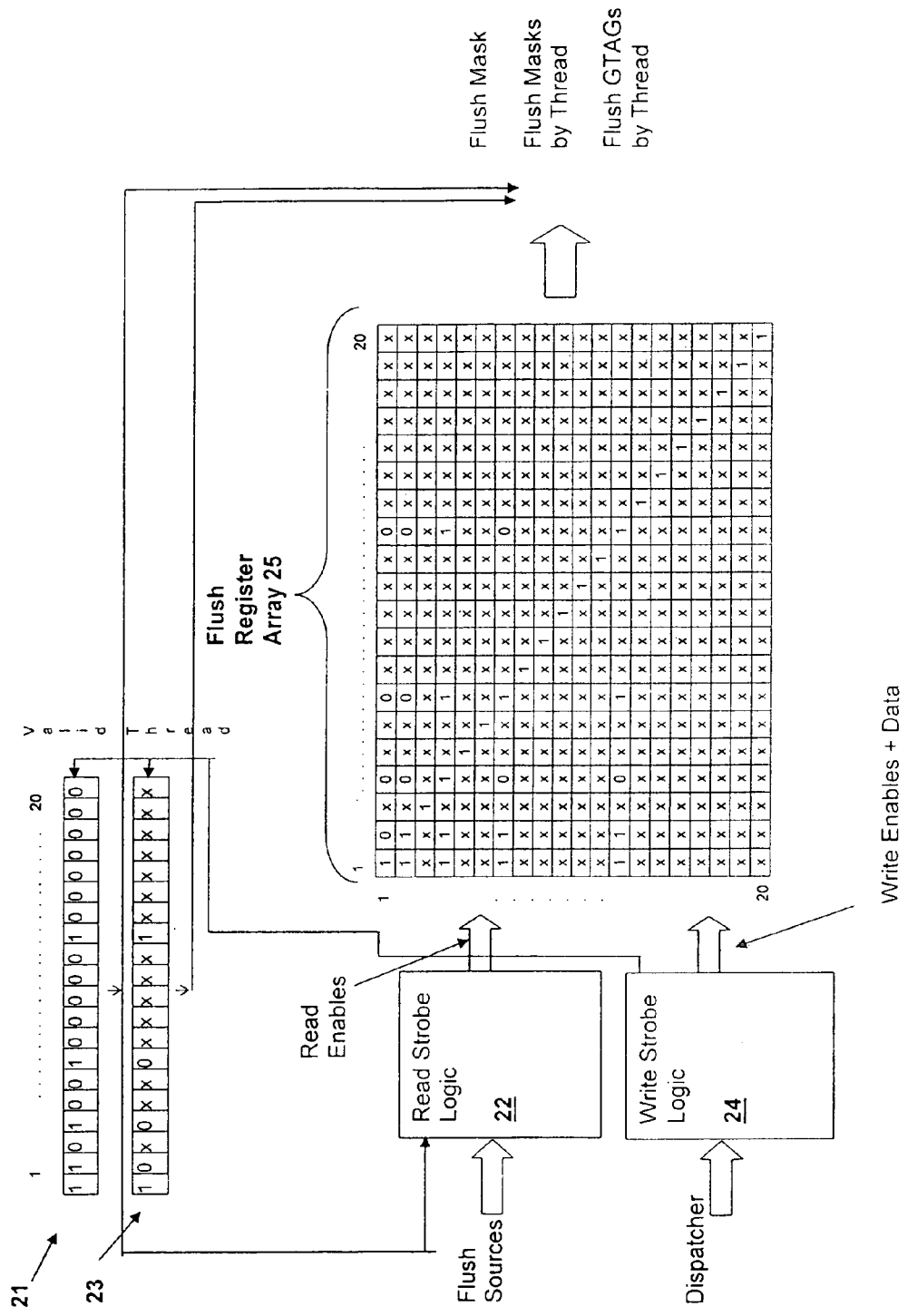
FIG. 2 is a pictorial diagram showing a flush mask register array and associated functional blocks in accordance with an embodiment of the present invention.

Referring now to FIG. 2, details are shown of a flush register array 25 and associated functional blocks, generally located within the above-mentioned completion unit of core execution unit 24, but may be elsewhere located within processor 10. Values within flush mask register array are indicated as set "1", reset "0" and invalid/don't-care values "X". Two registers, a valid register 21 and a thread indication register 23 are provided that each contain a word having bits associated with one of twenty entry rows in flush register array 25. Flush register array 25 stores tags identifying groups of instructions currently valid as bit masks written to rows of flush register array 25 from the IDU within core execution unit 14. Upon dispatch, a bit mask having a bit corresponding to an available entry row as well as bits corresponding to older entries that are valid is written to the available entry row in flush register array 25. Write strobe logic 24 provides the decode and data routing to write the bit mask to flush register array 25, as well as writing a thread indicator bit to thread register 23 and a logical "1" to the corresponding bit in validity register 21.

At flush time, when one or more flush directives are received by read strobe logic 22, read strobe logic 22 generates the required signals to access the selected rows' cell outputs of flush register array 25, qualified by the corresponding rows being marked valid in the valid register 21. In response, five word outputs are generated providing various information to units cooperating to implement the flush. The first is a flush mask identifying all of the instruction groups that need to be flushed (the selected group and all newer groups), the next two are individual flush masks for each thread and the last two are group tag (GTAG) read values for each thread. GTAGs are the identifiers stored in flush register array 25 that have bits set indicating the row location of the GTAG and older valid GTAG row locations.

As the present invention concerns an array of bit stores or "cells", the terms "column index" and "row index" indicate the vertical and horizontal position cells or groups of cells, as do the terms "column numbers" and "row numbers".

Figure 3:
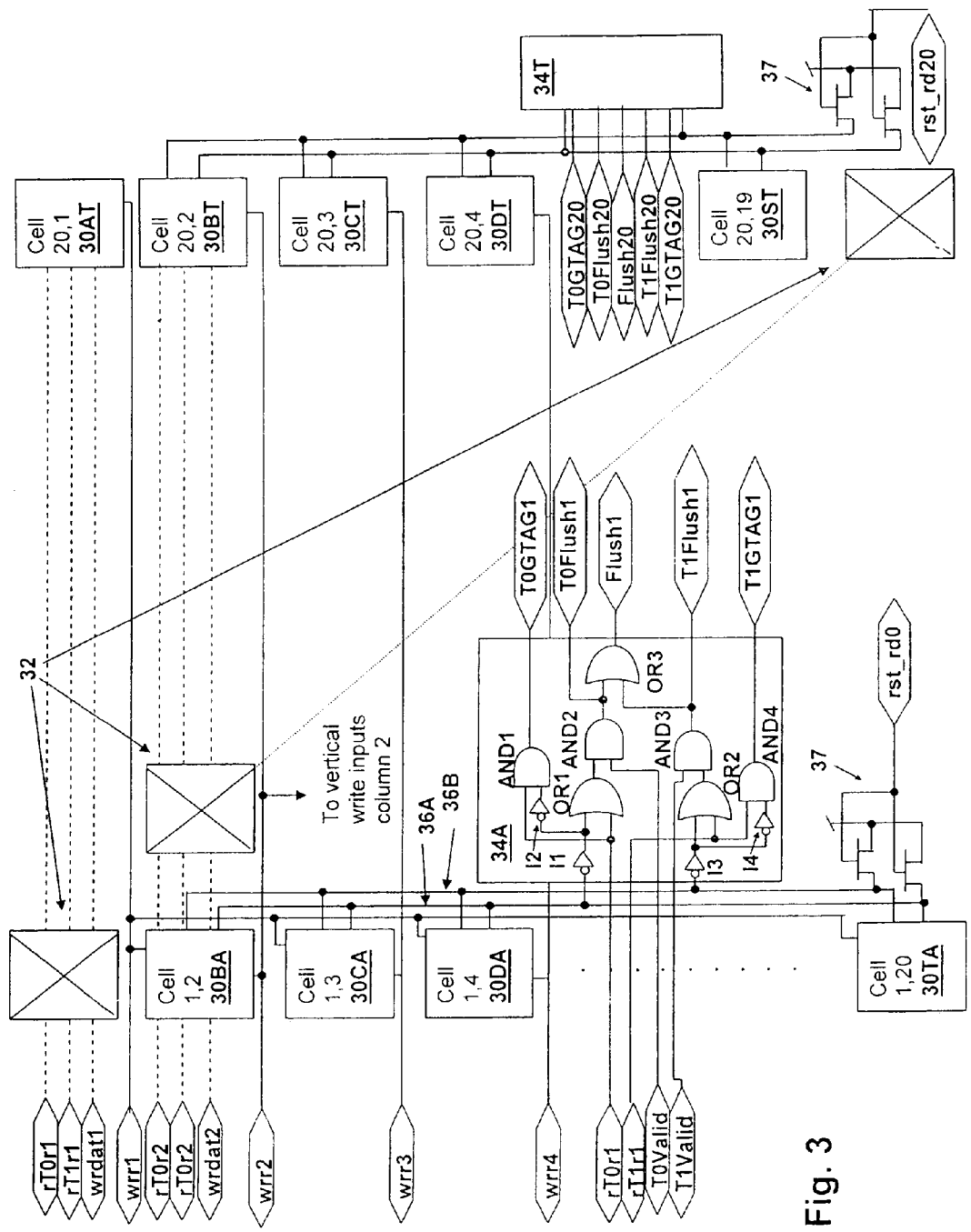
FIG. 3 is a schematic diagram depicting a flush mask register array in accordance with an embodiment of the present invention.

Referring now to FIG. 3, details of flush register array 25 are shown. A plurality of cells "30*rc*" are arranged in a matrix. The designators are of the form "30*rc*", where r is a letter from A–T indicating a row number between 1 and 20 and c is a letter from A–T indicating the column number. The cells present in flush register array will be hereinafter referred to as cells 30BA–30ST. Positions 32 for matrix locations having equal column and row numbers are empty, i.e., there are no cells 30*xx* where x is a row and column number specifying an equal row and column index. Absent cell locations in FIG. 3 are indicated by crossed-out boxes. The absence of the above-mentioned cells provides not only a reduction in circuit area, but simplifies the logic required to generate the flush outputs mentioned above. The flush logic outputs are generated by flush logic blocks 34A–T one for each column of flush register array 25. Flush logic blocks 34A–T are coupled to data outputs of each cell in their respective column, but the read enable inputs of the column cells are wired in a particular manner to provide a wired-AND logic computation that yields the desired flush mask outputs identifying the proper flush groups.

Each cell 30BA–30ST includes a vertical write enable input and a horizontal write enable input. The horizontal write enable inputs of cells 30BA–30ST are coupled to the row write strobe wrr1-20 (provided by write strobe logic 24 of FIG. 2) for the row in which the cell is a member. The row write strobe enables the GTAG bit corresponding to the cell position in the row to the storage of the cell, resulting in a write of the GTAG to the row. The vertical write enable inputs of cells 30BA–30ST are coupled to the row write strobe wrr1-20 corresponding to the number of the column in which the cell is a member and are reset inputs that set the storage value of the cell to a logical zero. Since there are no cells in positions for which the column number is equal to the row number, cells are only activated for a horizontal write or a vertical write and never both. Data inputs to the row consist of GTAG values having a bit set for each presently valid group. Since the group for which a tag is being written is always valid, the absence of the cell at the equal row, column position guarantees a value of "set" for the bit position corresponding to the group tag being written. The write strobes connected to the vertical write enables of the other cells in the column, when active, cause a reset of the bit corresponding to the group tag in all other rows, marking those rows (if valid) as corresponding to older group tag values, i.e., instruction groups that were earlier-dispatched. As flush register array 25 is populated with group tags, newer instruction groups can be identified by set bits that are not set in earlier-dispatched groups, as the bits for all currently valid groups have been set via row writes subsequent to the last reset of the other columns. As further rows are written, the column writes (vertical writes) will clear the bits of other rows in the columns corresponding to the further-written rows, marking them as rows older than the rows for which bits are set in those columns.

The computation of the flush mask and group tag outputs is performed by column logic blocks 34A–T in response to one or more flush directives received at read strobe logic 22 of FIG. 2. One or more read strobes rT0r1-20 for thread 0 and rT1r1-20 for thread 1 are activated, causing each activated cell 30BA–30ST in the selected rows to place their data on bitlines 36A (for thread read enabled) and 36B (for thread 1 read enabled). The use of common bitlines for the outputs provides a wired-AND function that combines each enabled cell in a column. The cells enabled onto bitlines 36A–B may be a single cell for a single group tag read, or may comprise multiple cells when multiple flush directives are received by read strobe logic 22. Preset circuits 37 are used to preset bitlines 36A–B prior to enabling any read strobes, so that bitlines 36A–B will be maintained at a logical "1" value unless a bit in an enabled row for the particular column is a zero. The output of bitlines 36A–B will be a zero unless an instruction group having a tag in a row number equal to the column number of the particular column is newer than all of the enabled rows.

Flush logic blocks 34A–T receive the bit line outputs via AND gates AND1 and AND4, qualify the T0GTAG1-20 and T1GTAG1-20 outputs with the thread read strobes for the row corresponding to the column number by performing a logical AND operation on the thread read strobes and the bitline values provided through inverters I1–4. The AND operation results in the group tag output for each thread being a zero for all bit positions (column positions) corresponding to non-enabled rows for each thread and a one only in the bit position corresponding to the oldest entry enabled for reading. Since a zero will be present in the older rows at column positions for newer rows during a multiple row read, the only bit that will be set in the T0GTAG1-20 and T1GTAG1-20 outputs will be the bit in the bit position corresponding to the row number of the oldest selected entry (the entry itself cannot reset bitlines 36A–36B in its own row, since there is no cell at that position).

Flush logic blocks 34A–T also compute thread-specific flush masks T0Flush1-20 and T1Flush1-20 by combining the inverted bitline outputs from inverters I1 and I3 with the read enable rT0r1-20 and rT1r1-20 for the row corresponding to the column of the particular flush logic block in a logical OR operation via OR gates OR1 and OR2. The outputs of OR gates OR1 and OR2 will be a "1" for columns having a column number to a read-enabled row for the associated thread (indicating an active flush request for that row/thread) and any row having an entry newer than all of the read-enabled rows. The result is a flush mask T0Flush1-20 and T1Flush1-20 that identifies all flush-requested rows plus rows containing newer entries for the associated thread. OR gate OR3 combines the thread-specific flush masks to produce a global flush mask Flush1-20 having bit positions set for all flush requested entries and identified newer entries.

Figure 4:
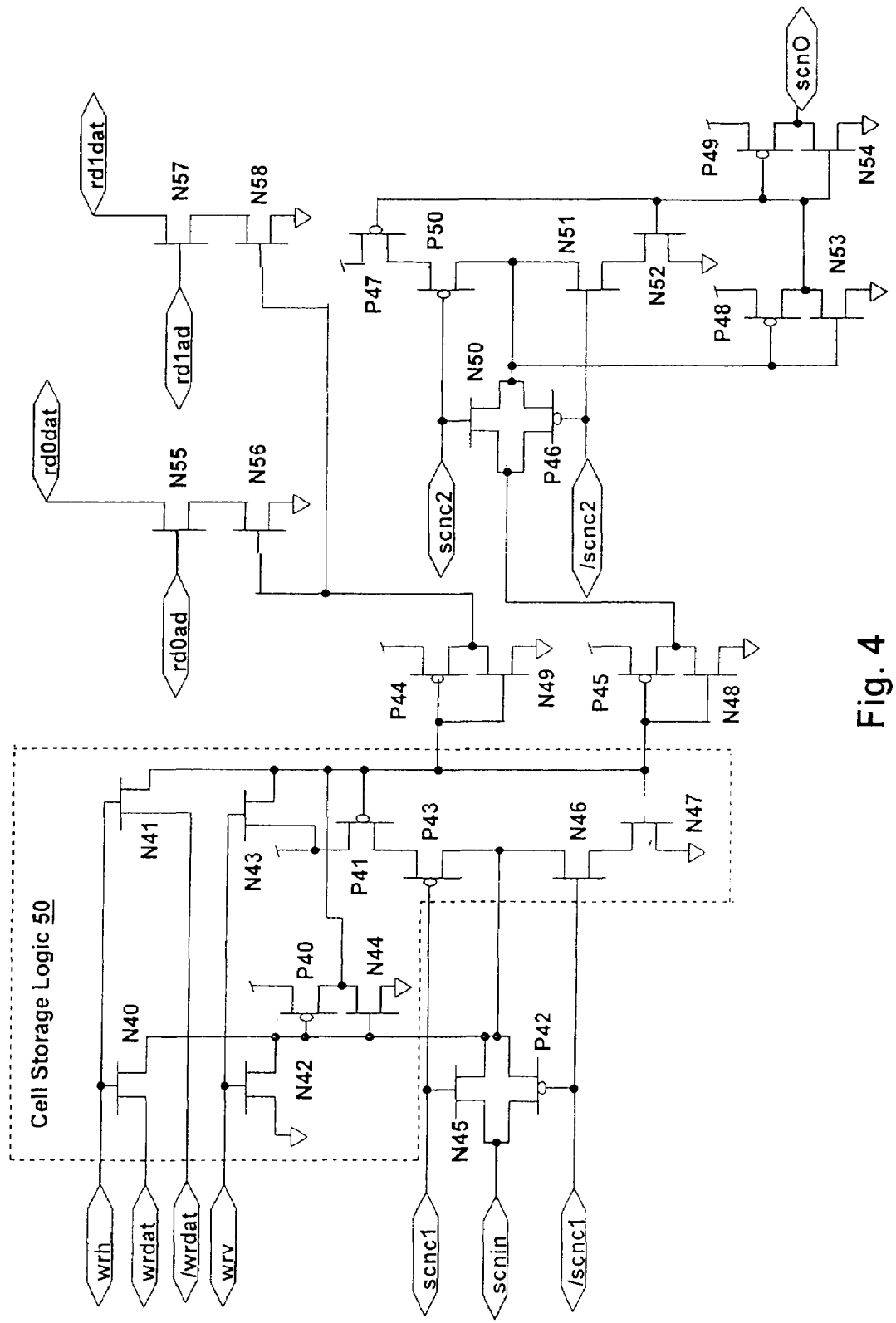
FIG. 4 is a schematic diagram depicting a cell within the flush mask register array of FIG. 3.

Referring now to FIG. 4, a schematic diagram of one of individual cells 30BA–30ST is depicted. The schematic includes scan logic for testing and controlling the state of the individual cell, and is included herein for completeness, although the scan logic is not required to provide the functionality of cells needed to implement the flush register array of the present invention. Cell Storage logic 50 includes the logic necessary to store and retrieve a static value from cells 30BA–30ST.

A storage element is formed by transistors P40 and N40 connected as an inverter back-to-back with another inverter formed by transistors N47 and P41. Transistors P43 and N46 are interposed between transistors N47 and P41 so that scan test circuitry can set the storage element through a pass gate formed by transistors N45 and P42. Scan input data is provided as signal scnin. Signals scnc1 and /scnc1 are complementary scan input strobes that place the data on scnin on the input of the inverter formed by transistors P40 and N40. Signal wrh is the horizontal write enable mentioned above for writing data values, provided as complementary pair wrdat and /wrdat to set the state of the storage element via transistors N40 and N41. The vertical write enable signal is wrv and enables transistors N42 and N43 to reset the state of the storage element.

An inverter formed by transistors P44 and N49 buffers the output of the storage element and provides an output to control transistors N56 and N58 that provide a signal for the two thread data read outputs rd0dat for thread 0 and rd1dat for thread 1. Transistors N55 and N57 enable the read data for thread 0 and thread 1 respectively, and are enabled by read enables rd0ad and rd1ad. An inverter formed by transistors P45 and N48 buffers the output of the storage element and provides a scan output from the storage element through a pass gate formed by transistors N50 and P46, that are enabled by complementary scan output sample signals scnc2 and /scnc2. An inverter formed by transistors P48 and N53 coupled back-to-back with another inverter formed by transistors P47 and N52 forms a scan latch enabled by interposed transistors P50 and N51 that are enabled by the opposite phase of scan output sample signals from the pass gate enable, latching the output of the pass gate. Transistors P49 and N54 form an inverter for buffering the scan latch output to scan output signal scn0.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A logic circuit, comprising
a plurality of bit stores arranged as a matrix, said bit stores populating said matrix excepting positions of equal row and column indices;
a logical output circuit coupled to outputs of said plurality of bit stores for delivering an output word in response to a plurality of row index selector inputs that selects all bit stores within a plurality of selected rows as inputs to a plurality of logical AND gates each associated with a bit position of said output word, whereby said output word comprises a bit mask having bits set corresponding to columns in which bits of all of said selected rows contain a logical one value.

2. The logic circuit of claim 1, wherein said logical AND gates are formed by bitlines providing a wired-AND function, and wherein said outputs of all of said bit stores forming each column are connected to a bitline associated with said column.

3. The logic circuit of claim 1, wherein each of said bit stores includes a first and a second output selectable by a first row index selector from a first set of row index selectors and a second row index selector from a second set of row index selectors, wherein said first outputs of said bit stores are selected to a first plurality of logical AND gates in response to said first row index selector and said second outputs of said bit stores are selected to a second plurality of logical AND gates in response to said second row index selector, and wherein said logical output circuit comprises a first output for producing a first output word corresponding to said first set of row index selectors and a second output for producing a second output word corresponding to said second set of row index selectors, whereby said first and second output words comprise bit masks having bits set corresponding to columns in which bits of all of said rows selected by active selectors within said corresponding set of row index selectors contain a logical one value.

4. The logical circuit of claim 1, further comprising a second logical output circuit having an input coupled to outputs of said plurality of bit stores for delivering a second output word in response to a plurality of row index selector inputs that selects all bit stores within a plurality of selected rows as inputs to a plurality of logical AND gates each associated with a bit position of said output word, and wherein said second logical output circuit further comprises a second plurality of logical AND gates each associated with said bit position of said output word, each having a first input coupled to an associated one of said plurality of logical AND gates and a second input coupled to an associated one of said row index selector inputs, whereby said second output word comprises a bit mask having bits set corresponding to columns having a column index equal to a row index of one of said selected rows and in which bits of all of said selected rows contain a logical one value.

5. The logical circuit of claim 1, further comprising a logical input circuit having a plurality of row write enable outputs coupled to row write enable inputs of said plurality of bit stores, wherein each of said row write enable outputs is coupled to all of said row write enable inputs of cells within an associated row of said matrix, and wherein said logical input circuit further has a data word output having bit positions each coupled to data inputs of an associated column of said plurality of bit stores whereby a write of a value of said data word output to a row for which said associated row write enable output is active is performed.

6. The logical circuit of claim 5, wherein each of said plurality of bit stores includes a reset input, and wherein each of said row write enable outputs are further coupled to reset inputs of all of said bit stores within an associated column having a column index equal to a row index of said row associated with said row write enable output, whereby a reset of all of said bit stores within a column having an index equal to a row index of a row for which said associated row write enable output is active is performed.

* * * * *